United States Patent
Weindorf

[11] Patent Number: 5,983,987
[45] Date of Patent: Nov. 16, 1999

[54] AIR CONDITIONER FOR VEHICLES

[75] Inventor: Manfred Weindorf, Vaihingen, Germany

[73] Assignee: Daimler-Benz Aktiengesellschaft, Stuttgart, Germany

[21] Appl. No.: 09/131,208

[22] Filed: Aug. 7, 1998

[30] Foreign Application Priority Data

Aug. 7, 1997 [DE] Germany .......................... 197 34 145

[51] Int. Cl.⁶ .............................. F25B 29/00; B60H 1/00
[52] U.S. Cl. .............................. 165/42; 165/43; 165/103; 237/12.3 A; 237/12.3 B
[58] Field of Search ............................. 165/42, 43, 103; 237/12.3 A, 12.3 B

[56] References Cited

U.S. PATENT DOCUMENTS

| | | | |
|---|---|---|---|
| 2,796,820 | 6/1957 | Moore et al. | 165/43 |
| 3,807,631 | 4/1974 | Mohr | 237/12.3 A |
| 4,108,376 | 8/1978 | Matsuda et al. | 237/12.3 B |
| 4,852,638 | 8/1989 | Hildebrand et al. | 237/12.3 B |
| 4,852,639 | 8/1989 | Horiguchi et al. | 165/103 |
| 5,106,018 | 4/1992 | Loup | 237/12.3 B |

FOREIGN PATENT DOCUMENTS

| | | | |
|---|---|---|---|
| 0 419 707 B1 | 4/1991 | European Pat. Off. | |
| 3446773 | 7/1986 | Germany | 237/12.3 A |
| 3510991 | 10/1986 | Germany | 165/42 |
| 0109421 | 6/1984 | Japan | 165/103 |

*Primary Examiner*—John K. Ford
*Attorney, Agent, or Firm*—Evenson, McKeown, Edwards & Lenahan, P.L.L.C.

[57] ABSTRACT

An air conditioner for vehicles has a housing and has an evaporator and a heat exchanger which, viewed in the air flow direction, are successively arranged in the housing at a distance from one another and enclose a housing section between one another whose bottom is approximately V-shaped. A warm air flap is swivellably arranged in the housing section for controlling the air supply to the heat exchanger. For achieving a very good air approach flow to the heat exchanger in all swivelling positions of the warm air flap and a sufficiently good water precipitation from the moisture-laden air flow, the arrangement of the swivel axis extending at a parallel distance from the forward and the rearward transverse flap edge is such that, in one swivelling end position of the warm air flap, the rearward flap edge rests on the bottom and the forward flap edge rests on the front edge of the heat exchanger, and, in the other swivelling end position, the rearward flap edge is swivelled in front of the air passage surface of the heat exchanger and the forward flap edge is situated approximately in a horizontal plane extending through the swivel axis.

20 Claims, 1 Drawing Sheet

AIR CONDITIONER FOR VEHICLES

BACKGROUND AND SUMMARY OF THE INVENTION

This application claims the priority of German Patent Application No. 197 34 145.4, filed Aug. 7, 1997, the disclosure of which is expressly incorporated by reference herein.

The invention relates to an air conditioner for vehicles having a housing, an evaporator and a heat exchanger which, viewed in the air flow direction, are successively arranged at a distance from one another in the housing and are aligned such that the air passage surfaces of the evaporator and the heat exchanger are situated approximately at a right angle with respect to one another. A housing section, which exists between the evaporator and the heat exchanger and whose bottom is constructed to be descending approximately in a V-shape from the lower edge of the evaporator and ascending to the rear edge of the heat exchanger, has a warm air flap which is arranged in the housing section to be swivellable about a swivel axis between two swivelling end positions and completely blocks the air flow to the heat exchanger in one swivelling end position and opens it up maximally in the other swiveling end position.

In the case of a known air conditioner of the above-mentioned type, such as in European Patent Document EP 0 419 707 B1, the warm air flap is fixed with its swivel axis on the V-shaped bottom of the housing section, specifically in its ascending area. In its blocking position, with its flap edge aligned in parallel to the swivel axis, the warm air flap rests against the edge of the heat exchanger which is in the front viewed in the air flow direction, such that the air passage surface of the heat exchanger is completely shut off. In its release position, the warm air flap rests against the bottom of the housing section. The warm air flap is restrictedly coupled with a cold air flap which is arranged in a bypass, which bypasses the heat exchanger, from the evaporator to a mixing space situated behind the heat exchanger. The warm air flap can take up any intermediate position between its two swivelling end positions. When the warm air flap is fully opened, an air guiding duct is formed between the heat exchanger and the ascending area of the bottom of the housing section, in which air guiding duct the air flow leaving the evaporator is guided to the heat exchanger.

It is an object of the invention to improve an air conditioner of the above-mentioned type such that, on the one hand, a very good air approach flow to the heat exchanger is ensured in all swivel positions of the warm air flap and, on the other hand, a sufficiently good water precipitation is achieved from the air flow which is moisture-laden after flowing through the evaporator.

This and other objects are achieved according to the present invention by an air conditioner for vehicles having a housing, an evaporator and a heat exchanger which, viewed in the air flow direction, are successively arranged at a distance from one another in the housing and are aligned such that the air passage surfaces of the evaporator and the heat exchanger are situated approximately at a right angle with respect to one another. A housing section, which exists between the evaporator and the heat exchanger and whose bottom is constructed to be descending approximately in a V-shape from the lower edge of the evaporator and ascending to the rear edge of the heat exchanger, has a warm air flap which is arranged in the housing section to be swivellable about a swivel axis between two swivelling end positions and completely blocks the air flow to the heat exchanger in one swivelling end position and opens it up maximally in the other swivelling end position. The swivel axis extends at a parallel distance from the flap edge which, viewed in the air flow direction, is in the front and in the rear, and its arrangement in the housing section is such that, in the blocking position of the warm air flap, the rearward flap edge rests against the bottom of the housing section in its ascending area, and the forward flap edge rests against the front edge of the heat exchanger. In the release position of the warm air flap, the rearward flap edge is swivelled in front of the air passage opening of the heat exchanger and the forward flap edge is situated in or close to a horizontal plane extending through the swivel axis.

The air conditioner according to the invention has the advantage that, as a result of the construction and the arrangement of the warm air flap according to the invention, the air, which, when the warm air flap is swivelled out of its blocking position, flows from the evaporator to the heat exchanger, is divided in each swivelling position of the warm air flap into two partial air flows, of which one flows along on the top side of the heat exchanger, and the other is guided in a flow duct formed between the warm air flap and the bottom of the housing section and leads to the heat exchanger. As a result, the warm air flap achieves an air guiding function which improves the approach flow to the heat exchanger. In addition, from the air flows which are restrictedly guided along the warm air flap and the bottom of the housing section, significantly more moisture and water droplets are precipitated in the boundary layer area along the warm air flap and the bottom than from an air flow flowing freely to the heat exchanger. The water droplets which in this case precipitate on the warm air flap and on the bottom are directed to the lowest point of the V-shaped bottom. As a result, the warm air flap also achieves a water separating function such that only already largely dehumidified air flows through the heat exchanger.

Expedient embodiments of the air conditioner according to the invention with advantageous further developments and improvements of the invention are described herein.

According to a preferred embodiment of the invention, a water drainage groove is constructed on the surface of the warm air flap facing the evaporator. The water drainage groove extends in parallel to the swivel axis and, viewed in the air flow direction, in front of the swivel axis and leads out freely at the two longitudinal lateral edges of the warm air flap. In this case, the groove bottom of the water drainage groove is constructed to be descending toward both longitudinal lateral edges of the warm air flap, which can be achieved by a slightly convex curvature of the warm air flap in the direction of its swivel axis symmetrically to the center line. By means of this water drainage groove, the water film forming on the top side of the warm air flap by the water droplets precipitating there is discharged very rapidly and removed from the air flow so that there is no danger that the precipitating water droplets are, in turn, entrained by the air flow.

This effect will still be improved if, according to an advantageous embodiment of the invention, longitudinal grooves, which extend transversely to the water drainage groove, are constructed on the surface of the flap part of the warm air flap situated in front of the swivel axis in the air flow direction, which longitudinal grooves lead out into the water drainage groove. In addition, these longitudinal grooves may lead out freely at the forward flap edge.

Other objects, advantages and novel features of the present invention will become apparent from the following detailed description of the invention when considered in conjunction with the accompanying drawings.

DETAILED DESCRIPTION OF THE DRAWINGS

Figure 1:
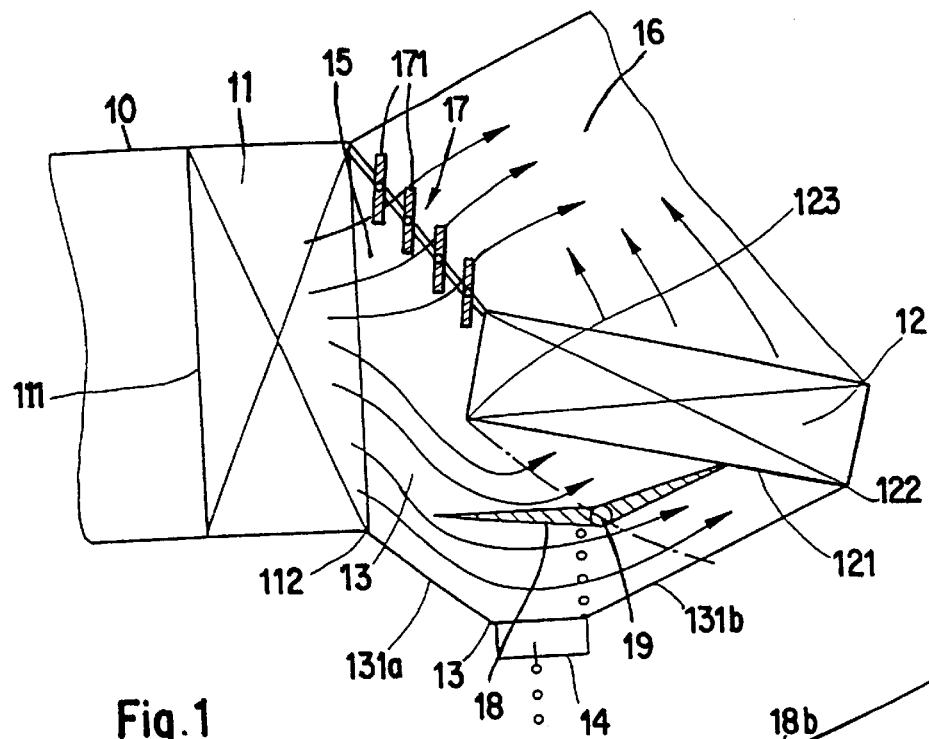
FIG. 1 is a schematic, longitudinally sectional cutout-type view of an air conditioner for a motor vehicle.

The air conditioner schematically outlined in a cutout-type manner in FIG. 1 has a housing 10 which, on the input side, is arranged on a fan which is not shown here. In the housing 10, an evaporator 11 and a heat exchanger 12 are successively arranged at a distance from one another when viewed in the air flow direction. In this case, the evaporator 11 and the heat exchanger 12 are aligned in the housing 10 such that their air passage surfaces 111 and 121 are situated approximately at a right angle with respect to one another, in which case they may enclose a small acute angle. The evaporator 11 and the heat exchanger 12 bound a housing section 13 whose bottom has an approximately V-shaped construction and is constructed to be descending from the lower edge 112 of the evaporator 11 and ascending toward the rear edge 122 of the heat exchanger 12. In the lowest area of the bottom, thus, in the knee between the descending and the ascending bottom area, a water outlet 14 is provided.

Above the heat exchanger 12, a bypass 15 leads from the evaporator 11 to a mixing space 16 constructed behind the heat exchanger 12 in the housing 10. In the bypass 15, a cold air flap 17 is arranged which in this case consists of a plurality of individual lamellae 171 which, depending on the swivelling position, allow a more or less large cold air flow to pass directly from the evaporator 11 to the mixing space 16.

In the housing section 13, a warm air flap 18 is arranged which can be swivelled manually or by a motor about a swivel axis 19 between two swivelling end positions. In one swivelling end position—the so-called blocking position of the warm air flap 18—the air supply to the heat exchanger 12 is hermetically blocked and, in the second swivelling end position—the so-called release position—the air supply to the heat exchanger 12 is maximally opened up. The warm air flap 18 is constructed such that its swivel axis 19 extends centrically in the flap surface and in parallel to the forward and rearward transversely extending flap edge 181 and 182. The arrangement of the swivel axis 19 in the housing section 13 takes place such that, in the blocking position of the warm air flap 18, the rearward flap edge 182 rests on the housing section bottom 131 in its ascending area 131b and the forward flap edge 181 rests on the forward edge 123 of the heat exchanger 12, and in the release position of the warm air flap 18, the rearward flap edge 182 is swivelled approximately centrically in front of the air passage surface 121 of the heat exchanger 12, and the forward flap edge 181 is situated in or close to a horizontal plane extending through the swivel axis 19. In this case, the swivel axis 19 is situated below the air passage surface 121 of the heat exchanger 12.

Figure 2:
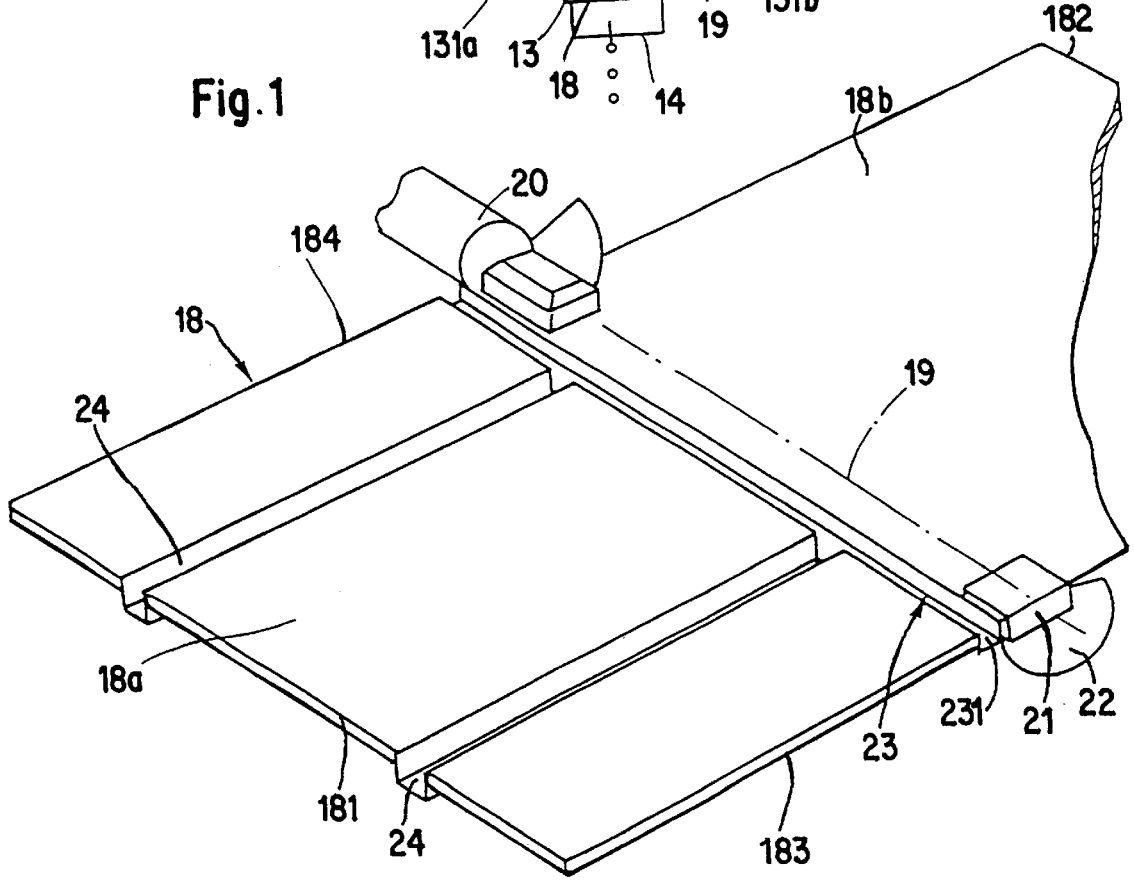
FIG. 2 is a cutout-type perspective view of a warm air flap in the air conditioner according to FIG. 1.

As outlined in FIG. 2, for implementing the swivellability of the warm air flap 18 about the swivel axis 19, two swivel pins 20, which are arranged coaxially to the swivel axis 19, are rotatably disposed in the housing 10, specifically in its lateral walls, which swivel pins 20 form-lockingly engage in lateral pin receiving devices 21 constructed in the warm air flap 18. Of the two swivel pins 20, only the swivel pin 20 on the left in the air flow direction is illustrated. A sealing sleeve 22, which presses against the assigned lateral wall of the housing section 13, is arranged around the pin receiving devices 21 and seals off the longitudinal side edges 183, 184 of the warm air flap 18 with respect to the lateral walls in the housing section 13. The significance of the sealing sleeves 22 will be discussed below.

As outlined in FIG. 1, the two flap parts 18a and 18b of the warm air flap 18 constructed in one piece, which are arranged in the air flow direction in front of and behind the swivel axis 19, are slightly bent with respect to one another. However, the two flap parts 18a and 18b may also be aligned with one another and form a plane surface.

As illustrated in FIG. 1, the warm air flap 18 swivelled out of its blocking position defines in each of its swivelling positions two air flow ducts which lead from the evaporator 11 to the heat exchanger 12 and whose clear openings depend on the swivelling position of the warm air flap 18. One air flow duct is bounded by the bottom 131 in the housing section 13 and the other air guiding duct is bounded by the air passage opening 121 of the heat exchanger 12. As a result, in addition to its control function for the air quantity penetrating the heat exchanger, the warm air flap 18 also carries out an air guiding function which produces an optimal air inflow on the heat exchanger 12. In addition, the warm air flap 18 takes over the function of a water separator because water droplets and mist droplets, which are entrained by the air flow in the evaporator 11, condense much more easily in the boundary layer area of the two air flows along the warm air flap 18, on the one hand, and along the bottom 131 of the housing section 13, on the other hand, and these droplets are therefore separated again from the air flows.

For the removal of the water film precipitating on the surface of the warm air flap 18, a water drainage groove 23 is constructed in the surface of the warm air flap 18, which water drainage groove 23 extends in parallel to and, viewed in the air flow direction, in front of the swivel axis 19 and leads out freely on the two longitudinal side edges 183, 184 of the warm air flap 18. The groove bottom of the water drainage groove 23 is constructed to be descending toward both longitudinal lateral edges 183, 184 of the warm air flap 18, which in the embodiment of FIG. 2, is achieved by the fact that the warm air flap 18 is slightly convexly curved in the direction of its swivel axis 19 and the curvature extends symmetrically to the center line. On the surface of the forward flap part 18a, additional longitudinal grooves 24, in this case, two longitudinal grooves 24 which extend at a right angle to the water drainage groove 23 are constructed which lead out into the water drainage groove 23. The two longitudinal grooves 24 are arranged in parallel to one another and symmetrically with respect to the flap center and lead out freely on the forward flap edge 181 of the warm air flap 18. These two longitudinal grooves 24 promote the draining of the water film forming on the warm air flap 18, in which case the water is guided to the water drainage groove 23 and drips laterally on the side walls of the housing 10 from the water drainage groove 23, in order to flow off by way of the V-shaped bottom 131 in the housing section 13 to the water outlet 14. In this case, the two sealing sleeves 22 on the pin receiving devices 21 of the warm air flap 18 which are situated directly behind the water drainage groove 23 prevent that the dripping-off water is entrained again by the air flow in the direction of the heat exchanger 12.

The invention is not limited to the above-described embodiment. Thus the swivel axis 19 need not extend centrically between the forward and the rearward flap edge 181, 182. According to the space situation, the swivel axis 19 may also have a different parallel distance from the forward flap edge 181, on the one hand, and the rearward flap edge 182, on the other hand. The warm air flap 18 need also not be constructed in one piece; on the contrary, it may be divided along its swivel axis 19 into two separate flap wings, each flap wing being constructed to be individually swivellable about the swivel axis 19.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air conditioner for a vehicle having a housing, in which an evaporator and a heat exchanger are successively arranged at a distance from one another in an air flow direction, the evaporator and heat exchanger being aligned such that air passage surfaces of the evaporator and the heat exchanger are situated approximately at a right angle with respect to one another, the air conditioner comprising:

a housing section of the housing existing between the evaporator and the heat exchanger and having a bottom constructed in an approximate V-shape so as to descend from a lower edge of the evaporator and to then ascend to a rear edge of the heat exchanger;

a warm air flap arranged in the housing section so as to be swivellable about a swivel axis between two swivelling end positions, the warm air flap completely blocking the air flow to the heat exchanger in one swivelling end position and maximally opening the air flow in the other swivelling end position;

wherein the swivel axis extends at a parallel distance from edges of the warm air flap which, viewed in the air flow direction, are in the front and the rear; and wherein the warm air flap is arranged in the housing section such that, in the blocking position, the rearward flap edge rests against a bottom of the housing section in the ascending area and the forward flap edge rests against the front edge of the heat exchanger, and wherein in a release position of the warm air flap, the rearward flap edge is swivelled in front of the air passage opening of the heat exchanger and the forward flap edge is situated in or close to a horizontal plane extending through the swivel axis.

2. Air conditioner according to claim 1, wherein the swivel axis extends centrically in the flap surface of the warm air flap and is arranged in the housing section below the air passage surface of the heat exchanger.

3. Air conditioner according to claim 1, wherein on a surface of the warm air flap facing the evaporator, a water drainage groove is constructed which is situated in parallel to and, viewed in the air flow direction, in front of the swivel axis and leads out freely on two longitudinal lateral edges of the warm air flap.

4. Air conditioner according to claim 2, wherein on a surface of the warm air flap facing the evaporator, a water drainage groove is constructed which is situated in parallel to and, viewed in the air flow direction, in front of the swivel axis and leads out freely on two longitudinal lateral edges of the warm air flap.

5. Air conditioner according to claim 3, wherein a groove bottom of the water drainage groove is constructed to be descending toward both longitudinal lateral edges of the warm air flap.

6. Air conditioner according to claim 4, wherein a groove bottom of the water drainage groove is constructed to be descending toward both longitudinal lateral edges of the warm air flap.

7. Air conditioner according to claim 5, wherein the warm air flap is curved slightly convexly in the direction of its swivel axis and symmetrically to its center line.

8. Air conditioner according to claim 6, wherein the warm air flap is curved slightly convexly in the direction of its swivel axis and symmetrically to its center line.

9. Air conditioner according to claim 3, wherein on a surface of a flap part of the warm air flap situated in front of the swivel axis viewed in the air flow direction, longitudinal grooves are constructed which extend transversely to the water drainage groove and which lead out into the water drainage groove.

10. Air conditioner according to claim 5, wherein on a surface of a flap part of the warm air flap situated in front of the swivel axis viewed in the air flow direction, longitudinal grooves are constructed which extend transversely to the water drainage groove and which lead out into the water drainage groove.

11. Air conditioner according to claim 7, wherein on a surface of a flap part of the warm air flap situated in front of the swivel axis viewed in the air flow direction, longitudinal grooves are constructed which extend transversely to the water drainage groove and which lead out into the water drainage groove.

12. Air conditioner according to claim 9, wherein the longitudinal grooves lead out freely on the forward flap edge.

13. Air conditioner according to claim 3, wherein the warm air flap is sealed off in a surrounding area of the swivel axis on its two longitudinal lateral edges with respect to side walls of the housing section.

14. Air conditioner according to claim 5, wherein the warm air flap is sealed off in a surrounding area of the swivel axis on its two longitudinal lateral edges with respect to side walls of the housing section.

15. Air conditioner according to claim 7, wherein the warm air flap is sealed off in a surrounding area of the swivel axis on its two longitudinal lateral edges with respect to side walls of the housing section.

16. Air conditioner according to claim 9, wherein the warm air flap is sealed off in a surrounding area of the swivel axis on its two longitudinal lateral edges with respect to side walls of the housing section.

17. Air conditioner according to claim 13, wherein two swivel pins, which are coaxial with the swivel axis, are rotatably disposed in the housing section and form-lockingly engage in two lateral pin receiving devices constructed in the warm air flap, and further wherein a sealing sleeve, which presses against the side walls of the housing section, is arranged around each of the pin receiving devices.

18. Air conditioner according to claim 1, wherein, along its swivel axis, the warm air flap is divided into two flap wings and each flap wing is constructed to be separately swivellable about the swivel axis.

19. Air conditioner according to claim 1, wherein a water outlet is provided at a lowest point of the V-shaped bottom of the housing section.

20. An air conditioner, comprising:

an evaporator;

a heat exchanger;

a housing section extending between the evaporator and the heat exchanger which, in an air-flow direction, are successively arranged at a distance from one another, said housing section having a bottom surface which descends from a lower edge of the evaporator and then ascends to a rear edge of the heat exchanger viewed in the air flow direction;

an air flap arranged in the housing section about a swivel axis which extends at a parallel distance from forward and rearward edges of the air flap;

wherein the rearward flap edge rests against the bottom of the housing section in an ascending area and the forward flap edge rests against a front edge of the heat exchanger in a blocking position of the air flap; and wherein the rearward flap edge is arranged in front of an air passage opening of the heat exchanger and the forward flap edge is arranged approximately in an horizontal plane extending through the swivel axis when in an open position of the air flap.

* * * * *